(12) United States Patent
Lee et al.

(10) Patent No.: US 6,345,093 B1
(45) Date of Patent: Feb. 5, 2002

(54) SYSTEM AND METHOD FOR PROVIDING AUTOMATED TAKE BACK AND TRANSFER FUNCTIONALITY TO A COMPUTER TELEPHONY SYSTEM

(75) Inventors: Gene W. Lee, Plano; Duane J. Badenhorst, Dallas, both of TX (US)

(73) Assignee: Davox Corporation, Westford, MA (US)

(*) Notice: Subject to any disclaimer, the term of this patent is extended or adjusted under 35 U.S.C. 154(b) by 0 days.

(21) Appl. No.: 09/290,241

(22) Filed: Apr. 13, 1999

(51) Int. Cl.$^7$ ................................................ H04M 3/00
(52) U.S. Cl. .............................. 379/265.12; 379/211.02; 379/212.01
(58) Field of Search ............................ 379/265.11, 309, 379/265.12, 266.02, 212.01, 211.02, 201.04

(56) References Cited

U.S. PATENT DOCUMENTS

| | | | |
|---|---|---|---|
| 5,555,299 A | 9/1996 | Maloney et al. | 379/212 |
| 5,684,870 A | 11/1997 | Maloney et al. | 379/212 |
| 5,740,240 A | 4/1998 | Jolissaint | 379/309 |
| 5,742,675 A | 4/1998 | Kilander et al. | 379/265 |
| 5,802,526 A | 9/1998 | Fawcett et al. | 707/104 |
| 5,848,143 A | 12/1998 | Andrews et al. | 379/219 |
| 5,870,464 A | 2/1999 | Brewster et al. | 379/219 |
| 5,973,745 A | 7/1999 | Hurd | 379/309 X |
| 6,201,804 B1 | 3/2001 | Kikinis | 379/309 X |

*Primary Examiner*—Creighton Smith
(74) *Attorney, Agent, or Firm*—Bourque & Associates, PA

(57) ABSTRACT

An automated take back and transfer (TBX) telephone call routing system for interfacing a party connected to a first call center agent located at a first call center with at least a second call center agent located at a second call center, wherein the second call center is remotely located from the first call center, is disclosed. The system includes a transfer call interface, which is displayed on an agent display associated with the first call center agent. The transfer call interface is configured to accept a remote agent identifier, which, in the preferred embodiment is the name of a remote agent or the name of a group of remote agents. The system also includes a database that includes a plurality of call center agent data records. Each call center agent data record includes a destination identifier field, where a remote agent name or group name is entered, and a destination address field, where a dial string is entered. The dial string includes a plurality of characters, which include a special character identifying the dial string as a TBX code and a destination address code. The system also includes a tone generator for generating a DTMF tone sequence corresponding to the TBX code and destination address code, which is transmitted to a telephone company central office (CO) to alert the CO that TBX is being used and the destination of the transfer.

11 Claims, 6 Drawing Sheets

SYSTEM AND METHOD FOR PROVIDING AUTOMATED TAKE BACK AND TRANSFER FUNCTIONALITY TO A COMPUTER TELEPHONY SYSTEM

FIELD OF THE INVENTION

The present invention concerns the field of computer telephony integration (CTI). Specifically, the invention provides an automated Take Back and Transfer (TBX) system and method that facilitates the transfer of connected parties between call center agents located at different call centers.

BACKGROUND OF THE INVENTION

Many businesses and customer service organizations utilize telephone call centers to place outbound telephone calls and receive inbound telephone calls to and from customers or potential customers, for example, for credit collection or telemarketing. Computer telephony integration (CTI) has allowed telephone call centers to more efficiently handle both outbound telephone calls and inbound telephone calls. These computerized telephony systems typically include an automated dialer that automatically places outbound telephone calls and an automatic call distributor (ACD) that handles large volumes of inbound telephone calls. These, and other components of the telephony system, are controlled by a telephone call center management system. One example of a system and method for integrating outbound and inbound telephone calls is disclosed in greater detail in U.S. Pat. No. 5,586,179 issued Dec. 17, 1996, assigned to the assignee of the present invention and incorporated herein by reference.

Telephone call centers also include a number of audio head sets and data terminals used by agents or operators to communicate with the called parties and calling parties. Using the data terminal, such as a PC, an agent can view and/or enter call record data pertaining to the party (e.g., the customer or potential customer) and the transaction being made. The telephone call center management system typically controls the allocation of the agents to the inbound and/or outbound telephone calls and the management of the data presented to the agents and entered by the agents. The processing of a series of telephone calls (inbound or outbound) in a telephone call center is often referred to as a call campaign.

To initiate an outbound call campaign, the telephone call center management system generates a predefined, sorted customer call list having a number of customer call records (CCRs) including, for example, a telephone number to be called, a name, address, account number, and other information pertaining to the customer and the transaction. The call records pertaining to an outbound call campaign are typically downloaded from a call record source, such as a host computer, and are organized, e.g., according to the calling time, into the call lists. The telephony system reads a call record from the predefined call lists, displays the information from that call record on a display at a terminal of an available agent, and dials the telephone number, either automatically or at the request of the agent. The system monitors the call and if an answer is detected, the called party is connected to the agent. The agent can then enter additional information and the call record in the call list will be updated accordingly upon completion of the outbound telephone call.

Outbound telephone calls are typically grouped according to a particular application. One example of an outbound telephone call campaign is in the field of telemarketing where the agents or telemarketing service representatives (TSRs) market products and/or services to the called party and take orders for the products and/or services. In this example, the telephone calls may be grouped according to the type of product or service that is being marketed.

Typically, for every outbound call application there is also an inbound call application. Customers or potential customers that have been called or are scheduled to be called in the outbound call campaign often place an inbound telephone call pertaining to that application. For example, a customer may be calling regarding an order placed during an outbound call made earlier in the day, or a potential customer may be calling back to place an order.

For an inbound telephone call campaign, the ACD or other similar device receives the inbound telephone calls and distributes the inbound telephone calls to the appropriate available agent. Typically, the call center management system determines the appropriate agent(s) and allocates the agent accordingly. Upon requesting information from the calling party, such as a name, address, telephone number, or account number, the agent can obtain additional information pertaining to the calling party, if any exists, from the host computer. Alternatively, a Voice Response Unit (VRU) can be used to request the information from the calling party and automatically transfer any additional information from the host computer to the agent. Such a system is described in greater detail in U.S. Pat. No. 5,164,981 issued Nov. 17, 1992, assigned to the assignee of the present invention and incorporated herein by reference.

Once a call (either an inbound or an outbound call) is connected to a particular agent and interactive communications are conducted between the call center agent and the called or calling party (hereinafter the connected party), the agent may determine that an agent from a different call center is better suited to assist the connected party. In the past, when an agent determined that a different agent, from a different call center, would be better suited to handling a matter, the agent would need to place the call on hold, access a separate trunk line and, using that trunk, contact an agent at a remote site. If the remote agent is able to assist the connected party, then the agent at the first call center must connect the call to the remote agent. As can be seen, this process requires the use of two trunks associated with the first call center and another trunk associated with the second call center. Tying up this amount of trunk lines adversely affects the efficiency of call centers.

Recently, telephone companies have provided call centers with an enhanced feature, known as take back and transfer (TBX). TBX provides a call center with the means of transferring a call to a remote call center without tying up trunk lines in both call centers. TBX is implemented by sending DTMF tones on an active call. These tones are made up of a combination of an initialization tone sequence followed by digit tones that define the transfer destination. The digit tones are not the actual phone number that would be dialed to make a call. Rather, the transfer digits are codes, which are set up by the telephone company central office (CO) to define the trunk/device of a desired destination. Accordingly, TBX can not be used to transfer a call to an arbitrary device.

A prior art TBX event is shown in FIGS. 1A–1D. In FIG. 1A a connected party 10 is connected to a call center agent at a first call center 20 via a telephone central office 30. The call connection includes a connected party connection 12, which connects the connected party and the CO and a first call center connection 14, which connects the CO and the first call center agent 20. Once connected, the connected party 10 and first call center agent 20 can interact.

During the call, if the first call center agent 20 determines that an agent at a remote call center 40 (FIG. 1B) may be better equipped to handle the needs of the connected party 10, the first call center agent 20 would send the TBX tones to the CO 30, followed by the destination digit tones that would identify the desired destination agent 40. This would cause the CO 30 to suspend the connected party connection 12'. However, the suspended connected party connection 12' is maintained to allow the connected party 10 to be either reconnected to the first call center agent 20 or to the second call center agent 40.

While the connected party connection 12' is suspended at the CO, the first call center agent 20 is connected to the second call center agent via the first call center agent connection 14, which connects the first call center agent to the CO 30, and a second call center agent connection 16, which connects the CO 30 to the second call center agent 40. At this point in the process, a single trunk line to the first call center is utilized and a single trunk line to the second call center is utilized, thus eliminating the use of a second trunk line associated with the first call center.

As shown in FIG. 1C, if the first call center agent 20 determines that the second call center agent 40 is in fact the proper agent to handle the suspended call, then, the first call center agent can initiate the connection of the connected party connection 12 with the established second call center connection 16 by simply hanging up his or her connection to the second call center agent. In this manner the first call center connection is dropped and now the only connection established is between the connected party 10 and the second call center agent 40 using the connected party connection 12 and the second call center connection 16. The first call center connection 14 is terminated. In this manner, the first call center no longer needs to tie up any trunk lines to facilitate the connection. Accordingly, a total of two trunk lines that would otherwise be required to make the connection are eliminated.

On the other hand, if the interaction between the first call center agent 20 and the second call center agent 40 (FIG. 1B) results in a determination that the second call center agent 40 is not the proper agent to assist the connected party 10, then, as shown in FIG. 1D, the first call center agent can reestablish the his/her connection to the connected party via the connected party connection 12 and the first call center connection 14. This is accomplished by sending an abort DTMF tone sequence to the CO. The abort DTMF tone sequence which drops the connection between the CO 30 and the second call center agent 40 and reconnects the connected party to the first call center agent.

In any event, the prior art TBX methods require a call center agent to know the TBX tones that must first be sent to the CO in order to initiate a TBX event. He/she is then required to look up a transfer code for the remote agent and transfer the call by sending a TBX tone sequence to the telephone company central office (CO), followed by the transfer code for the proper agent. The look up process is generally performed by physically looking at a printed list and finding the appropriate transfer code.

Overall, the current state of the art involves very manual processes, which are time consuming and prone to operator error. For example, an agent must memorize TBX setup and abort code sequences and must read arbitrary digits from a printed list and enter them correctly on a telephone keypad.

Accordingly, there is a need for a system and method that can automate Take Back and Transfer (TBX) events. Such a system should eliminate as much manual operator action as possible to reduce or eliminate the possibility of operator errors.

SUMMARY OF THE INVENTION

The disclosed invention provides an automated take back and transfer (TBX) telephone call routing system for interfacing a party connected to a first call center agent located at a first call center with at least a second call center agent located at a second call center, wherein the second call center is remotely located from the first call center.

The system includes a transfer call interface, which is displayed on an agent display associated with the first call center agent. The transfer call interface is configured to accept a remote agent identifier, which, in the preferred embodiment is the name of a remote agent or the name of a group of remote agents.

The system also includes a database that includes a plurality of call center agent data records. Each call center agent data record includes a destination identifier field, where a remote agent name or group name is entered, and a destination address field, where a dial string is entered. The dial string includes a plurality of characters, which include a special character identifying the dial string as a TBX code and a destination address code. The system also includes a tone generator for generating a DTMF tone sequence corresponding to the TBX code and destination address code, which is transmitted to a telephone company central office (CO) to alert the CO that TBX is being used and the destination of the transfer.

Also disclosed is an automated method of implementing telephone call take back and transfer (TBX) events. The automated method facilitates the routing of a telephone call that has been established between a connected party and a first call center agent located at a first call center to at least a second call center agent located at a second call center, wherein the second call center is remotely located from said first call center. The method includes the following steps.

First, TBX codes, including a TBX initialization code and a TBX abort code are defined, using a telephony setup dialog displayed on an administrator display associated with the first call center. Then, a plurality of call center agent data records are stored in an agent database. Each call center agent data record includes a destination name field and a destination address field. Each destination address field includes a dial string that includes a plurality of characters. One of the characters is a special character identifying the dial string as a TBX code.

The agent destination names are displayed on an agent display associated with the first call center agent. The first call center agent then selects a second call center agent to route the connected call to by selecting one of the destination agent names displayed on the first call center agent display.

The dial string associated with the selected second call center agent is then retrieved from the database and the dial sting is identified as a TBX dial string by identifying the special character included in the plurality of characters. Next, the special character is stripped from the dial string and is replaced with the TBX initialization code. A concatenated dial string, which includes the TBX initialization code, is then sent to a telephone company central office (CO) through which said connected party is connected to said first call center agent.

Upon receipt of the dial string including the TBX initialization code, the CO suspends the connected party connection at the CO and connects the first call center agent with the second call center agent via the CO. Finally, a two-button transfer action dialog box, including complete and abort buttons, is displayed on the first call center agent's display. The first call center agent may select one of the buttons in response to information received by the first call center agent during the first call center agent/second call center agent telephone connection.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1A:
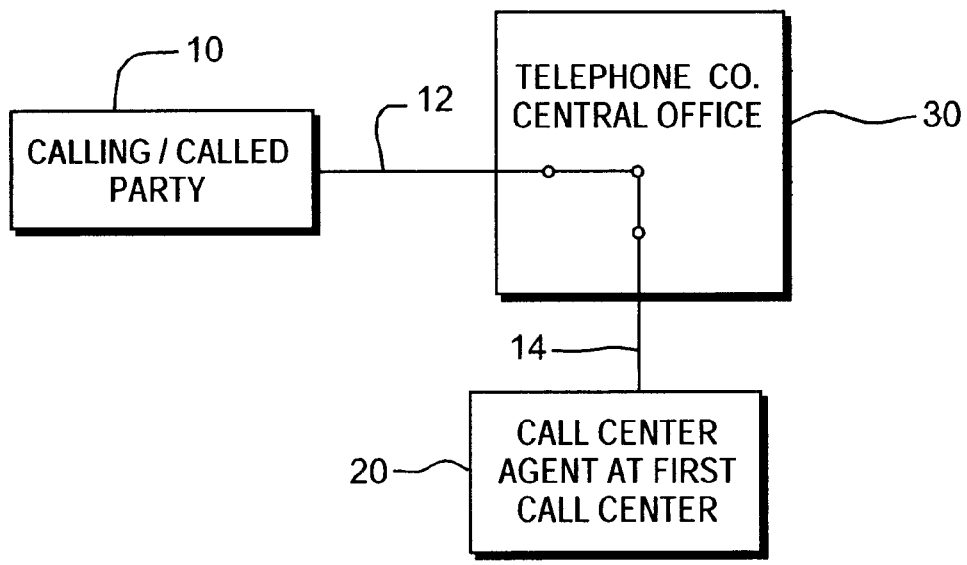
FIGS. 1A–1D are functional block diagrams of a prior art Take Back and Transfer (TBX) event.
Figure 1B:
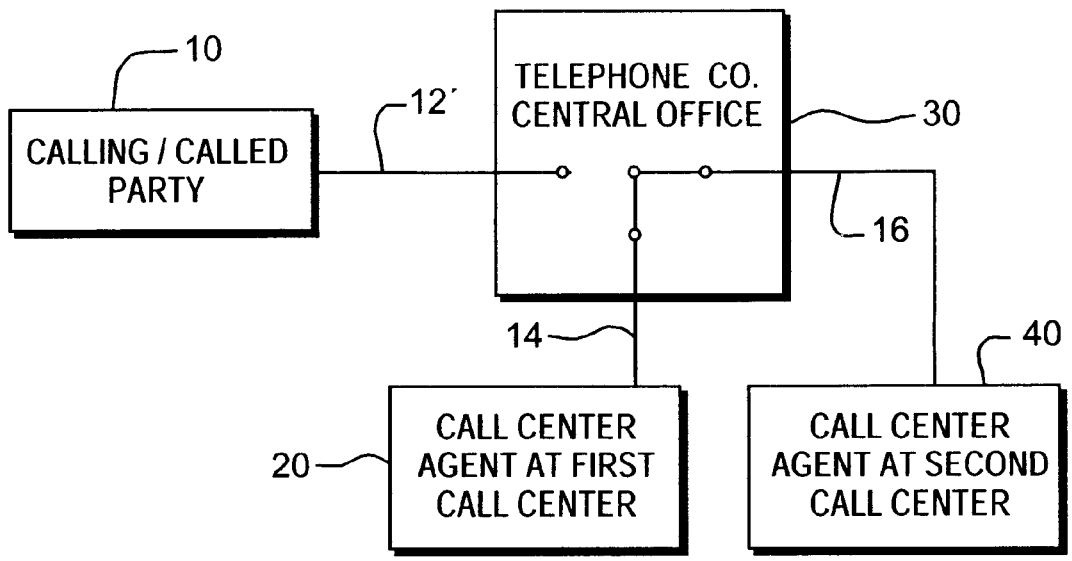
Figure 1C:
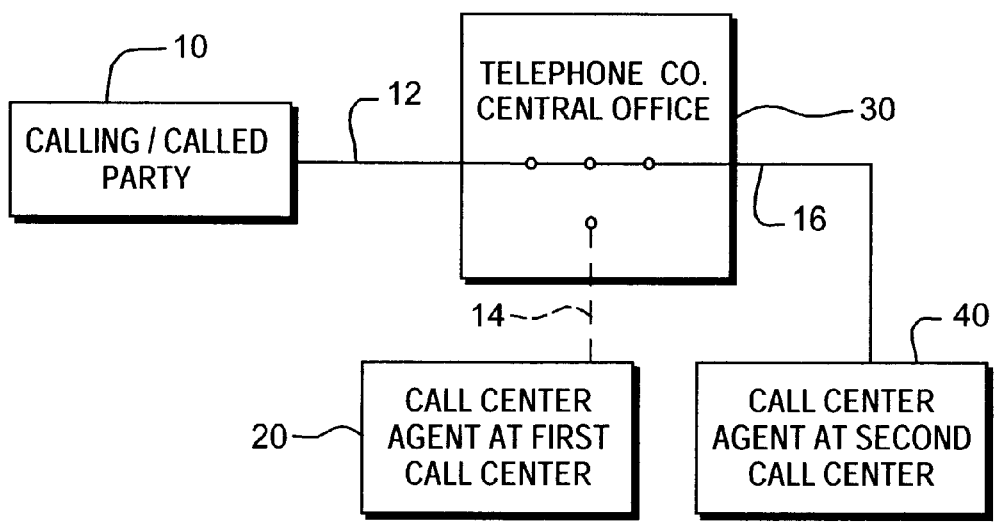
Figure 1D:
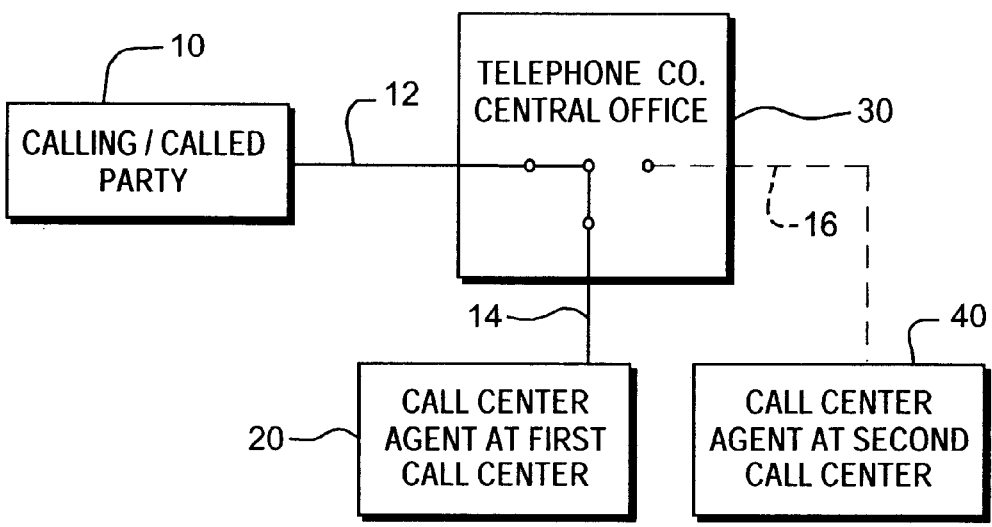
Figure 2:
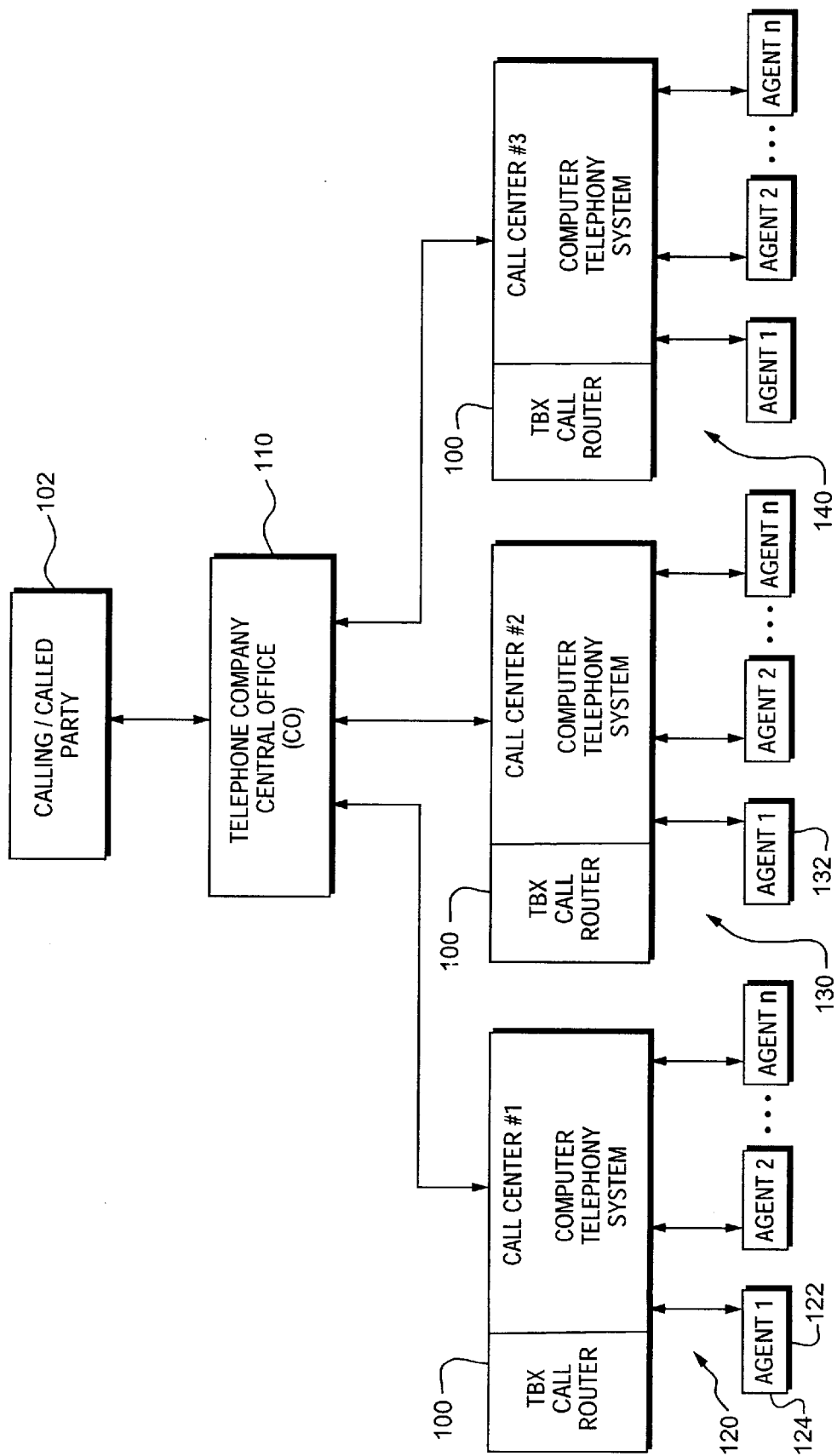
FIG. 2 is a block diagram showing a plurality of call centers available for connection to a connected party through a telephone company central office (CO)
Figure 3:
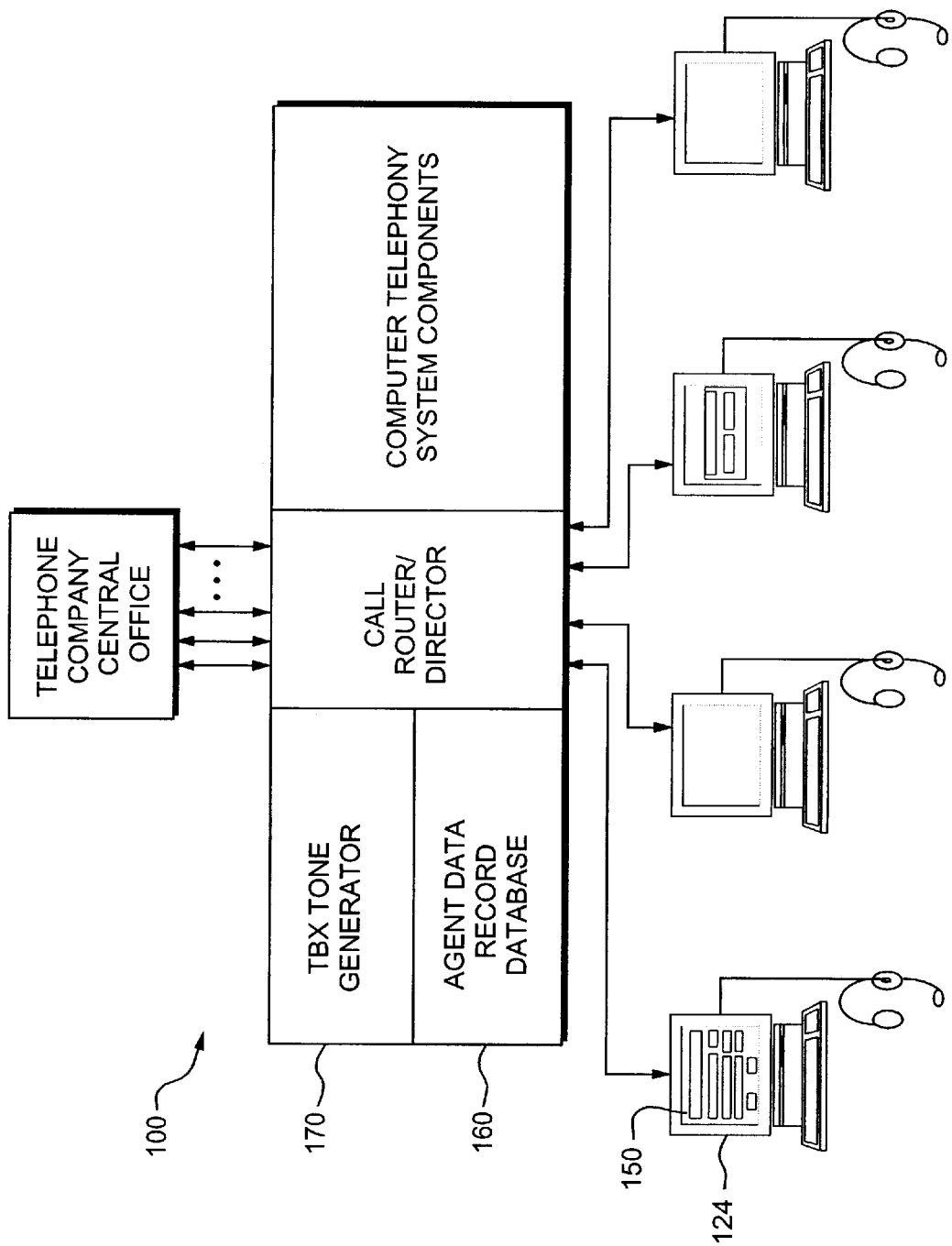
FIG. 3 is a detailed block diagram of the components of an automated TBX system according to the teachings of the present invention.

Turning now to the figures and, in particular, FIGS. 2 and 3, an automated Take Back and Transfer (TBX) telephone call routing system 100 is shown. The automated TBX telephone call routing system allows a calling/called party, hereinafter the connected party 102, who is connected to a first call center agent 122 via a telephone company central office 110 to be easily routed to at least a second call center agent 132 located at a second call center 130, should the first call center agent 122 determine, during his or her interaction with the connected party 102, that a different agent would be better able to handle the connected call. The automated TBX telephone call routing system 100 takes advantage of TBX capabilities provided by a telephone company's central office (CO).

The automated TBX telephone call routing system accomplishes the routing of connected calls with minimum agent interaction and allows calls and connected calls to be routed to agents located at remotely located call centers without any knowledge, on the part of the first call center agent 122 as to the exact location of the second or subsequent call center agent to whom the connected party 102 is being routed.

Figure 5:
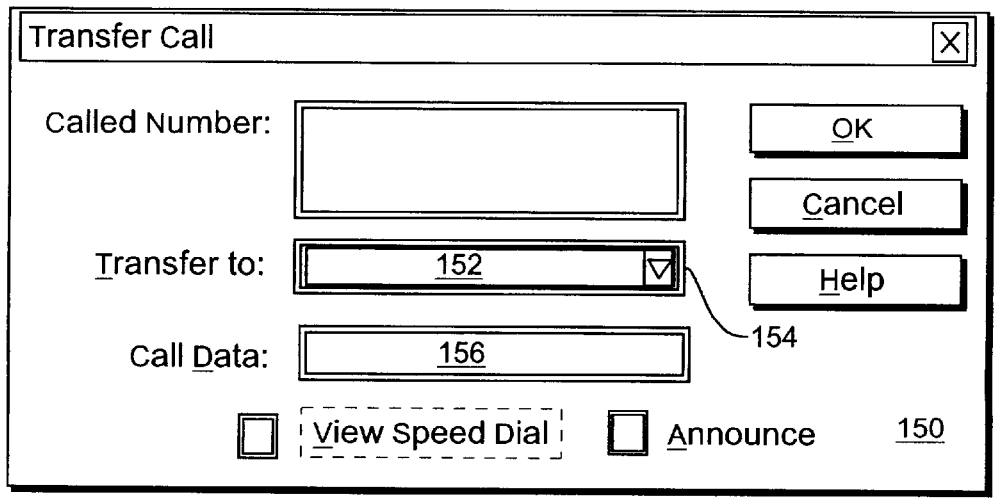
FIG. 5 is a computer screen display showing the call transfer dialog box of FIG. 3.

The TBX telephone call routing system 100 of the present invention includes a transfer call interface 150 (FIGS. 3 and 5), which is displayed on an agent display 124 that is associated with the first call center agent 122. The transfer call interface 150 is configured to accept a remote agent identifier to whom a connected party may be transferred. The remote agent identifier is entered in a "transfer to" field 152 by either typing an identifier directly into the field or by selecting from a list of available remote agent identifiers from a remote agent identifier list activated using pull-down menu icon 154.

In addition to identifying the remote agent to whom a connected party is to be transferred, the first call center agent may also enter data associated with the connected call in a "call data" window 156 associated with the transfer call interface 150.

The automated TBX telephone call routing system also includes an agent data record database 160. The database includes a plurality of call center agent data records, each of which includes an agent destination name field and an agent destination address field. The agent data name field corresponds to the agent identifier names, which may be entered by a first call center agent using the transfer call interface 150 as explained above. On the other hand, the agent destination address field includes a dial string, which defines the location of each call center agent using characters defined by the CO to represent a TBX code. Each dial string includes at least one special character, which identifies the dial string as a TBX code.

Also included in the automated TBX call routing system is a tone generator 170 for generating a tone sequence in response to a dial string, which informs the CO that TBX is being used and the proper destination to route a connected call.

One benefit of the disclosed system is it allows a first call center agent to initiate TBX events using the same transfer call dialog box used to transfer connected parties to other call center agents located at the same call center as the first call center agent. Accordingly, the first call center agent does not need to know any of the special codes or dial string sequences associated with a TBX event.

Figure 4:
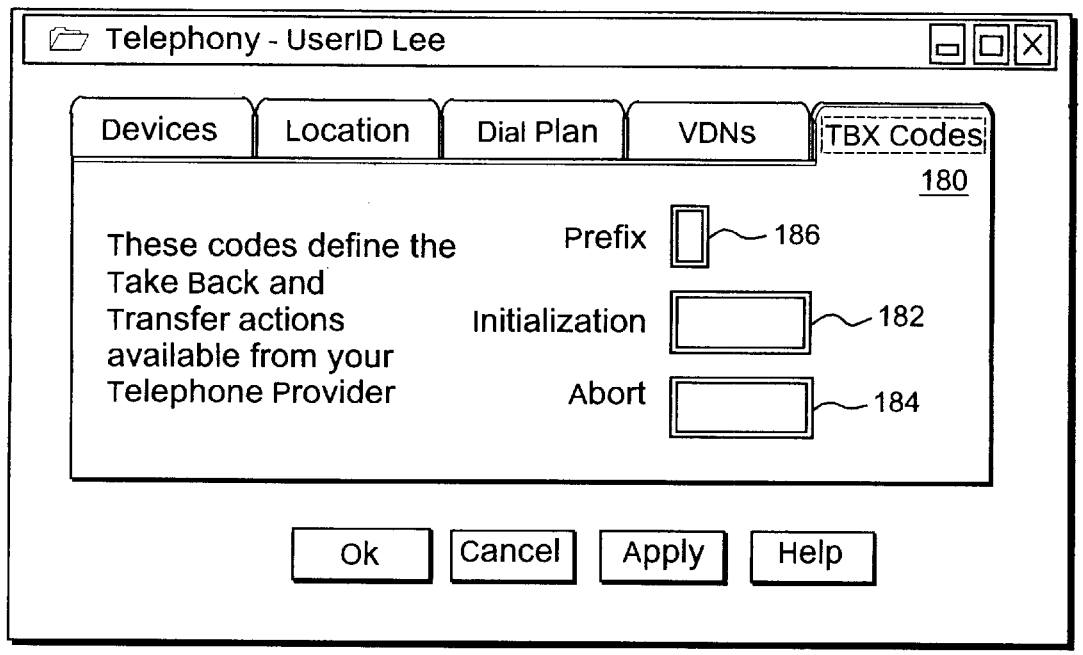
FIG. 4 is an administrator screen display, which allows a system administrator to input special codes associated with TBX events.

The transparency of a TBX event, from the perspective of a first call center agent, is accomplished by a setup dialog box 180 (FIG. 4), which is displayed on a call center supervisor display. The setup dialog box 180 is configured to accept a predefined TBX initialization code 182, a TBX abort code 184 and a special character or prefix 186, which is used to identify a dial string as a TBX code.

Figure 6:
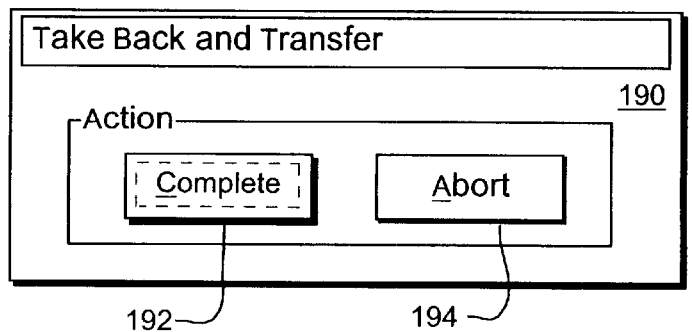
FIG. 6 is a computer screen display showing the transfer action dialog box of FIG. 3.

Once a first call center agent is connected to a second call center agent, a transfer action dialog box 190 is displayed on a first call center agent display (FIG. 6). The transfer action dialog box includes a complete event icon 192 and an abort icon 194. If, during the interaction between the first call center agent and the connected second call center agent, the first call center agent determines that the connected second call center agent is, in fact, the proper party to handle the connected call, then the first call center agent would complete the TBX event and, thereby, transfer the connected party to the second call center agent by selecting the complete icon. If, on the other hand, the first call center agent determines that the second call center agent is not, in fact, the proper agent to handle the connected call, then the first call center agent would select the abort icon 194 which would disconnect the connection made between the first call center agent and the second call center agent and reconnect the connected party to the first call center agent.

Figure 7:
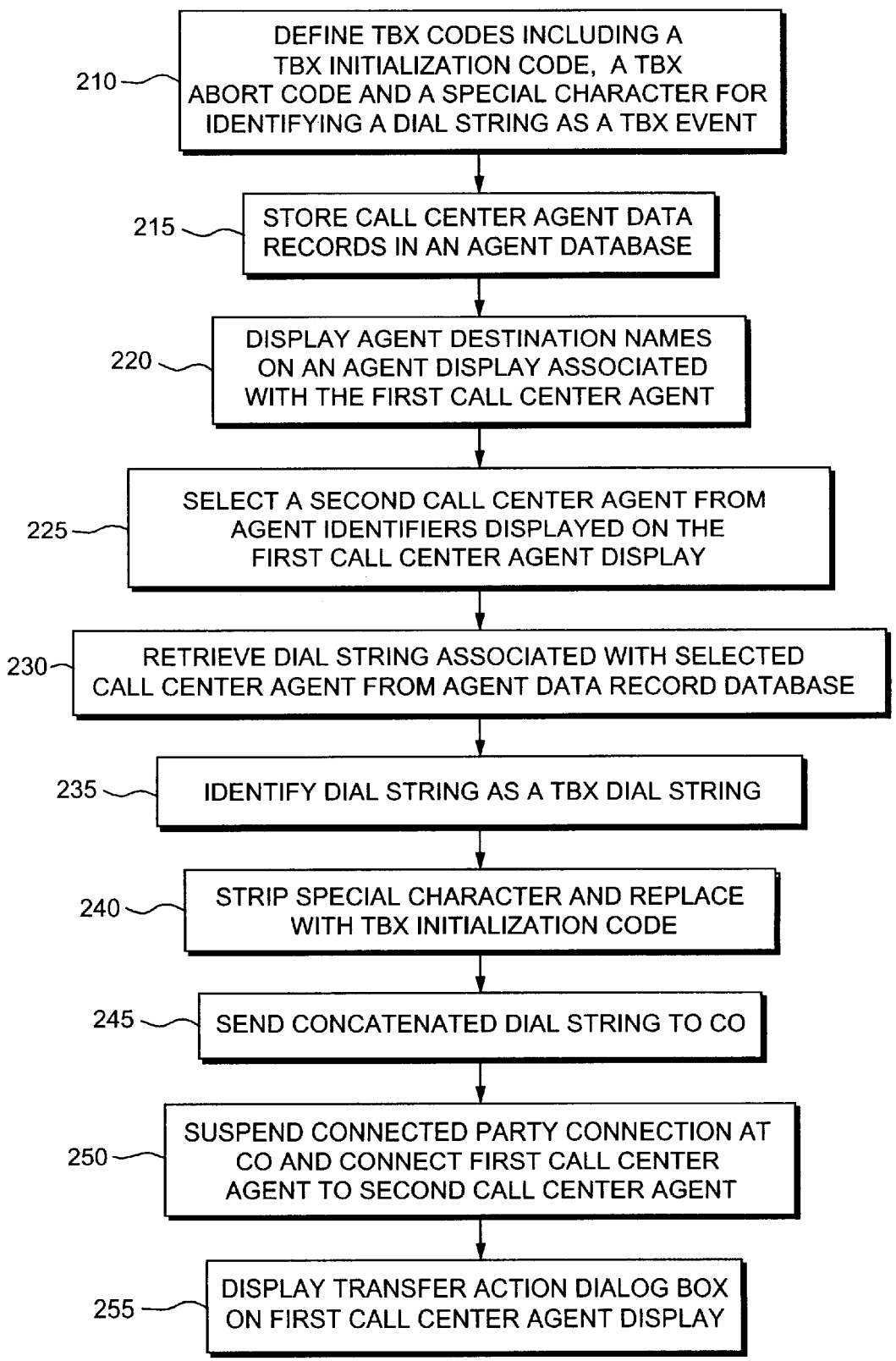
FIG. 7 is a flowchart showing a method of implementing telephone call TBX events according to the present invention.

Turning now to FIG. 7, an automated method 200 of implementing telephone call TBX events to facilitate the routing of a telephone call between a connected party and a first call center agent located at a first call center to at least a second call center agent located at a second call center, wherein said second call center is remotely located from said first call center is shown. The method 200 begins by defining TBX codes, including a TBX initialization code, a TBX abort code, and a special character for identifying a dial string as a TBX event, step 210. The TBX code definition step uses a telephony setup dialog box displayed on an administrator display associated with the first call center.

Next, in step 215, a plurality of call center agent data records are stored in an agent database. Each data record includes a destination name field and a definition address field. The destination address field includes a dial string comprising a plurality of characters, wherein for each call center agent located at the remote call center, one of the characters included in the dialog string is a special character identifying the plurality of characters as a TBX code. In operation, the agent destination names are displayed on an agent display associated with the first call center agent, step 220. The first call center agent selects a second call center agent by selecting one of the agent destination names displayed on the first call center agent display, step 225.

In response to a selected second call center agent, the dial string associated with the selected second call center agent is retrieved from the agent data record database, step 230. The retrieved dial string is then identified as a TBX dial string by identifying the special character included in the plurality of characters included in the dial string, step 235.

Once a dial string is identified as a TBX dial string, then the special character is stripped from the dial string and is replaced with the TBX initialization code, step 240. In step 245, a concatenated dial string including the TBX initialization code is sent to a telephone company central office (CO) through which the connected party is connected to the first call center agent.

Upon receipt of a concatenated dial string including the TBX initialization code, the connected party connection is suspended at the CO and the first call center agent is connected to the second call center agent, step 250. While the first call center agent is connected to the second call center agent, in step 255, a two-button transfer action dialog box is displayed on the first call center agent display.

The transfer action dialog box includes complete and abort buttons for selection by the first call center agent in response to information received by the first call center agent during the first call center agent/second call center agent telephone connection. If the first call center agent determines that the second call center agent is the proper agent to handle the connected party, then the connected party is connected to the second call center agent in response to selection, by the first call center agent, of the complete button displayed on the transfer action dialog box.

If, on the other hand, the first call center agent determines that the second call center agent is not the proper party to handle the connected call, then the connection between the first call center agent and second call center agent is terminated upon selection of the abort button, which simultaneously reconnects the suspended connected party to the first call center agent.

Accordingly, the disclosed invention provides an automated system and method of implementing telephone call TBX events, which eliminates the need on the part of a first call center agent to know whether or not a second call center agent to whom a connected party is to be directed is located at the same location as the first call center agent or is located at a remote call center. In addition, the automated system and method of implementing telephone call TBX events eliminates the need, on the part of a first call center agent to know any special codes associated with the TBX events.

Modifications and substitutions by one of ordinary skill in the art are considered to be within the scope of the present invention which is not to be limited except by the claims which follow.

What is claimed is:

1. An automated take back and transfer (TBX) telephone call routing system for interfacing a party connected to a first call center agent located at a first call center with at least a second call center agent located at a second call center, said second call center being remotely located from said first call center, said system comprising:

a transfer call interface displayed on an agent display associated with said first call center agent, said transfer call interface configured to accept a remote agent identifier;

a database including a plurality of call center agent data records, each said data record including a destination name field and a destination address field, wherein said destination address field including a dial string comprising a plurality of characters, wherein one of said characters comprises a special character identifying said plurality of characters as a TBX code; and a tone generator for generating a tone sequence for generating DTMF tones to inform a telephone company central office (CO) that TBX is being used and the proper destination to route the connected party.

2. The automated take back and transfer (TBX) telephone call routing system as claimed in claim 1, wherein said transfer call interface comprises a dialog box including a pull down menu for displaying a choice of available second call center agents to which a call may be transferred.

3. The automated take back and transfer (TBX) telephone call routing system as claimed in claim 1, wherein said transfer call interface comprises a call data field configured to allow said first call center agent to enter data relevant to a connected call.

4. The automated take back and transfer (TBX) telephone call routing system as claimed in claim 1, wherein said transfer call interface further comprises a transfer action dialog box displayed on said first call center agent display while said first agent is connected to said second agent, said transfer action dialog box including complete and abort icons to route a connected party to said second call center agent and disconnect said second call center agent and reconnect said connected party to said first call center agent, respectively.

5. The automated take back and transfer (TBX) telephone call routing system as claimed in claim 1, further comprising a setup dialog box displayed on a call center supervisor display, said setup dialog box configured to accept predefined TBX initialization and abort codes and said special character identifying said plurality of characters as a TBX code.

6. The automated take back and transfer (TBX) telephone call routing system as claimed in claim 1, wherein said remote agent identifier comprises a name of a remotely located second call center agent.

7. The automated take back and transfer (TBX) telephone call routing system as claimed in claim 1, wherein said remote agent identifier comprises a name of a group of remotely located call center agents.

8. The automated take back and transfer (TBX) telephone call routing system as claimed in claim 1, wherein said special character comprises a prefix.

9. An automated method of implementing telephone call take back and transfer (TBX) events to facilitate the routing of a telephone call between a connected party and a first call center agent located at a first call center to at least a second call center agent located at a second call center, said second call center remotely located from said first call center, said method comprising the steps of:

defining TBX codes, including a TBX initialization code, a TBX abort code and a special character for identifying a dial string as a TBX event, using a telephony setup dialog box displayed on an administrator display associated with said first call center;

storing, a plurality of call center agent data records in an agent database, each said data record including a destination agent identifier field and a destination address field, said destination address field including a dial string comprising a plurality of characters, wherein for each call center agent located at a remote call center, one of said characters comprises a special character identifying said plurality of characters as a TBX code;

displaying said destination agent identifiers on an agent display associated with said first call center agent;

selecting a second call center agent by selecting one of said destination agent identifiers displayed on said first call center agent display;

retrieving said dial string associated with said selected second call center agent;

identifying said retrieved dial string as a TBX dial string by identifying said special character included in said plurality of characters;

stripping said special character from said dial string and replacing it with said TBX initialization code;

sending a concatenated dial string including said TBX initialization code to a telephone company central office (CO) through which said connected party is connected to said first call center agent;

suspending the connected party connection at said CO and connecting said first call center agent with said second call center agent via said CO; and displaying on said first call center agent display a two-button transfer action dialog box, including complete and abort buttons for selection by said first call center agent in response to information received by said first call center agent during the first call center agent/second call center agent telephone connection.

10. The automated method of implementing telephone call TBX events as claimed in claim 9 further comprising the step of selecting said complete button displayed on said transfer action dialog box to connect said suspended connected party to said second call center agent via said CO.

11. The automated method of implementing telephone call TBX events as claimed in claim 9 further comprising the step of selecting said abort button displayed on said transfer action dialog box to reconnect said suspended connected party to said first call center agent.

* * * * *